(12) United States Patent
Marko et al.

(10) Patent No.: US 6,492,821 B1
(45) Date of Patent: Dec. 10, 2002

(54) METHOD AND APPARATUS FOR DETECTION SIGNAL PROCESSING

(75) Inventors: Lawrence J. Marko, Savage, MN (US); Brian P. Rosengren, Eden Prairie, MN (US); Neal A. Schumacher, Golden Valley, MN (US)

(73) Assignee: Banner Engineering Corporation, Minneapolis, MN (US)

( * ) Notice: Subject to any disclaimer, the term of this patent is extended or adjusted under 35 U.S.C. 154(b) by 372 days.

(21) Appl. No.: 09/629,499

(22) Filed: Jul. 31, 2000

(51) Int. Cl.[7] .................. G01R 27/26; G01R 27/08; G06K 7/10; G08B 13/08

(52) U.S. Cl. .................. 324/671; 324/686; 324/690; 235/462.01; 340/545.4

(58) Field of Search .................. 324/660, 667, 324/678, 690, 661, 662, 671, 681, 676, 663; 235/383, 462.01, 492; 347/217; 280/735; 340/438, 545.4

(56) References Cited

U.S. PATENT DOCUMENTS

| | | | |
|---|---|---|---|
| 3,896,425 A | 7/1975 | Erichsen | 340/563 |
| 4,661,797 A | 4/1987 | Schmall | 340/561 |
| 4,914,421 A | 4/1990 | d'Alayer de Costemore d'Arc et al. | 369/53.41 |
| 5,166,679 A | 11/1992 | Vranish et al. | 340/870.37 |
| 5,214,388 A | 5/1993 | Vranish et al. | 324/683 |
| 5,373,245 A | 12/1994 | Vranish | 324/662 |
| 5,442,347 A | 8/1995 | Vranish | 340/870.37 |
| 5,539,292 A | 7/1996 | Vranish | 318/568.21 |
| 5,650,730 A | 7/1997 | Herbst, Jr. | 324/690 |
| 5,726,581 A | 3/1998 | Vranish | 324/688 |
| 5,730,165 A | 3/1998 | Philipp | 137/1 |
| 5,793,217 A | 8/1998 | Herbst, Jr. | 324/690 |

FOREIGN PATENT DOCUMENTS

DE   195 21 129 C1   10/1996

OTHER PUBLICATIONS

"Con–Tech", "CS2000 Features", http://con–tech.com/features_cp.htm, last updated Oct. 16, 2000 (we were aware of this website on or about Aug. 24, 2000).

"Con–Tech", "CS2000–QD Label Sensor", http://con– tech.com/cs2000qd_cp.htm, last updated Oct. 16, 2000 (we were aware of this website on or about Aug. 24, 2000).

"Quantum Research Group Ltd", "Creating a sensor of achievement", *Focus*, (Jan. 1998), http://interquant.com/patents.htm, last updated Jul. 12, 1999.

"All Label", "All Label Sees all, detectsall!", *Rechner*, Ed. No. 12, http://www.rechner–sensors.de/alllabgb.htm, last updated Jul. 12, 1999.

"Lion Precision", "LRD2100 Label Edge Detection System", *Label Detection Systems*, http://www.lionprecision.com/label/index.html, last updated Jul. 12, 1999.

Rosengren, entitled Method and Apparatus for Detection Sensor Shielding, filed Jul. 31, 200, Ser. No. 09/628,711.

*Primary Examiner*—N. Le
*Assistant Examiner*—James Kerveros
(74) *Attorney, Agent, or Firm*—Merchant & Gould

(57) ABSTRACT

A system and method are disclosed for detecting the occurrence of an external event. The system eliminates the need for users to adjust amplifier offsets as well as detection thresholds by continually analyzing the signal and optimizing the offset and threshold values accordingly. Additionally, the system detects the external events in a noisy environment when the duration of the events vary by several orders of magnitude by employing cascaded difference filters.

26 Claims, 15 Drawing Sheets

METHOD AND APPARATUS FOR DETECTION SIGNAL PROCESSING

TECHNICAL FIELD

The present invention relates to a method and apparatus for processing a signal. More specifically, the present invention relates to processing a signal to detect the occurrence of an external event.

BACKGROUND

Detection devices determine when a particular event occurs. Examples of detection devices include beam sensors such as those used in automatic doors. The beam sensor determines when a person has approached the door by detecting when the beam has been reflected or broken. Once the person is detected by the sensor, the door is automatically opened for the user. Other examples include label sensors. Label sensors detect labels as they pass by the sensor on a web. The detection of the label allows proper high-speed counting of labels as well as proper removal of the labels from the web.

Conventionally, the electronics of such detection devices require a user to make threshold adjustments. This adjustment is necessary due to variations in the sensing conditions. In the label sensor example, web flutter and label inconsistencies create noise in the signal. A threshold must be properly chosen to distinguish a rising or falling label edge signal from the noise. Because the web flutter and label inconsistencies change from one web to the next, the threshold must be adjusted by the user each time a new web is analyzed to produce accurate results.

Also, the electronics of detection devices require a user to make offset adjustments. An offset adjustment maintains a baseline amplified signal at a desired midway point between two sensing thresholds, one for a falling signal and one for a rising signal. These rising and falling signals represent transitions created by an external event. For instance, when a leading label edge is sensed the signal rises to a level indicating the label is present. When a trailing label edge is sensed the signal falls to a level indicating the label is not present. The signal must rise beyond a rising threshold to indicate that a leading label edge has been sensed, and the signal must fall below a falling threshold to indicate a trailing label edge has been sensed.

Amplifiers are used in the detection device to scale the detection signal to useful levels, and these amplifiers are susceptible to fluctuations in performance and calibration due to humidity, ambient temperature, and other factors. The fluctuations affect the level of the baseline signal which then affects the reliability of the detection since the baseline signal may stray too far from a threshold for a rise or fall to be properly detected. A user must continuously monitor and adjust the baseline signal to ensure that it remains midway between the two threshold levels.

Furthermore, external events may occur randomly with no consistency, and detection of these event is often done in a noisy environment. Determining the occurrence of such events is difficult because the noise can produce false detections. Furthermore, accurate detection of randomly occurring events is difficult because resulting detection signals may range from nearly DC to very high frequencies, thus rendering differentiation schemes optimized for a given frequency range virtually inoperable.

Detection sensors would be more effective if no user adjustments were necessary due to variations in the environment including noise, ambient conditions, and the disparity of event frequency. Eliminating the user threshold adjustment and/or user offset adjustment improves the ease of use of the sensor as well as the reliability of the results it produces. Similarly, providing a system that can differentiate between detection signals spanning from DC to a much higher frequency further improves the ease of use and reliability of the sensor.

SUMMARY

The present invention addresses these problems by removing the need of the user to adjust the system to optimize the threshold level and the offset of the amplifier based on the sensing conditions and the particular characteristics of the event being detected. Furthermore, the present invention addresses the problem of accurately detecting events with widely varying durations in noisy environments.

The invention is embodied in apparatuses and methods for detecting a change in a signal having a level that fluctuates in response to the external event. The apparatus includes an adjustable amplifier module for generating an amplified signal and having a signal input and an offset input. The signal input of the amplifier module is electrically connected to the signal to be detected. An offset adjusting module may be included to continually adjust the offset voltage of the adjustable amplifier module by generating an offset signal based upon the amplified signal to maintain an observed median value of the observed range for the amplified signals between a minimum and a maximum observed value. The offset signal is coupled to the offset input of the adjustable amplifier module.

The apparatus may also include a cascaded difference filter module for receiving the amplified signal to detect an occurrence of the external event by detecting when the amplified signal changes to a value greater than a threshold value. The cascaded difference filter quantifies the change in signal over multiple time intervals. A threshold adjusting module may also be included to continually adjust the threshold value based upon the amplified signal to maintain the threshold value at a desired percentage of a maximum range of observed amplified signals.

DETAILED DESCRIPTION

Figure 1:
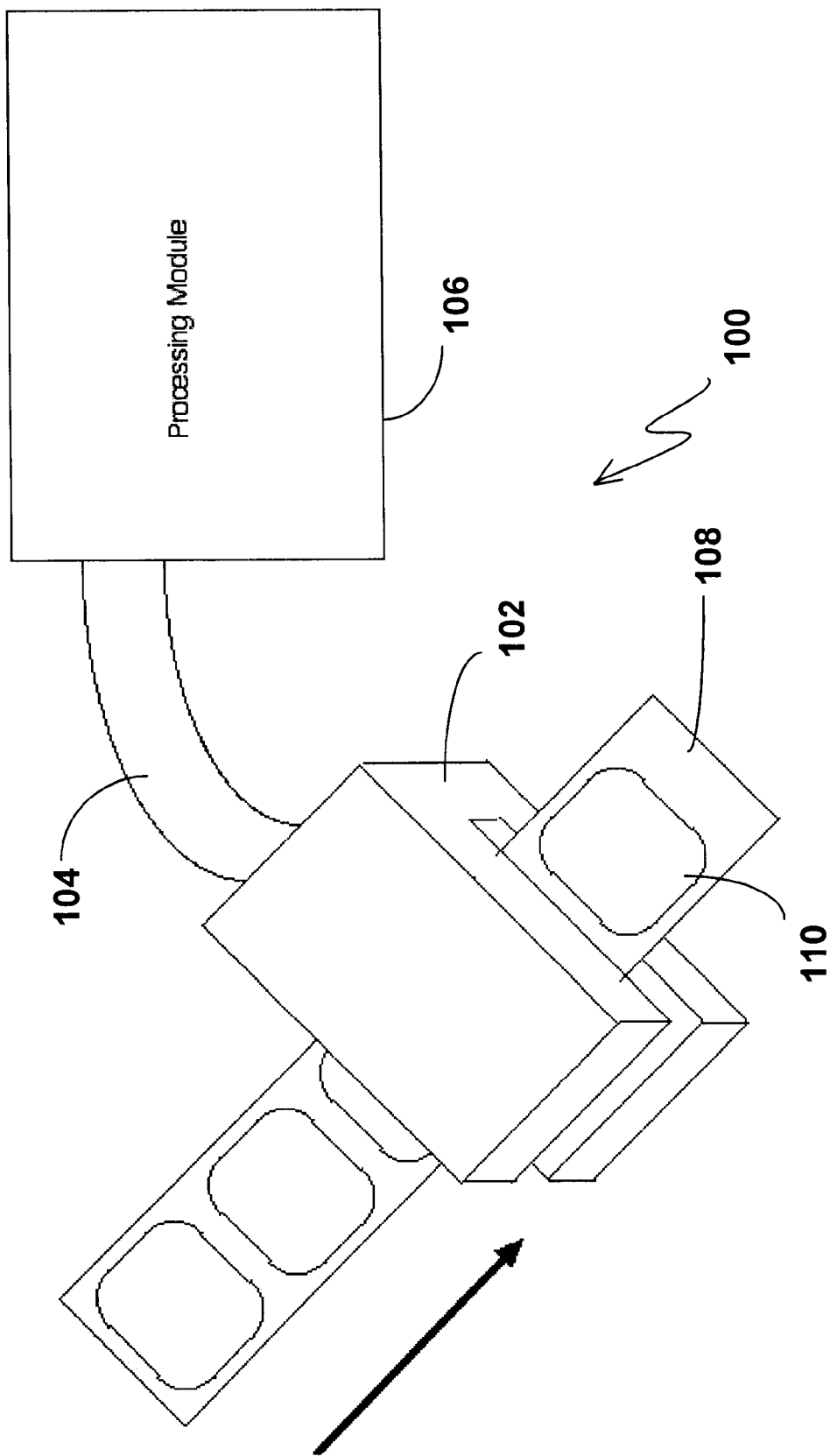
FIG. 1 illustrates a label web, sensor unit, and associated processing module.

Various embodiments of the present invention will be described in detail with reference to the drawings, wherein like reference numerals represent like parts and assemblies through the several views. Reference to various embodiments does not limit the scope of the invention, which is limited only by the scope of the claims attached hereto.

Several embodiments of the detection sensor are described. These embodiments provide exemplary hardware implementations and operation flows of the process taken to detect external events, such as label transitions. These embodiments include a system that can account for noise and other variations in the sensing conditions that may create voltage drifts in amplifiers without requiring adjustments by the user. The system included in these embodiments can also determine the presence of external events occurring at random frequencies that produce detection signals spanning a very wide bandwidth, even in the presence of noise.

Although the exemplary embodiments are directed to capacitive type label sensors, many other sensor types can be implemented by the present invention and these sensors may be used for many purposes in addition to sensing label transitions. Other examples of sensors include but are not limited to optical sensors, ultrasonic sensors, and inductive sensors. Other sensors and sensor applications that apply to this invention are well known in the art.

With reference to FIG. 1, a basic capacitive type label sensor system 100 is shown. The system 100 includes a capacitive sensing unit 102 that receives the label web 108. Labels 110 are periodically spaced along the web 108. Typically, a feeding mechanism (not shown) supplies the label web 108 continuously to the sensing unit 102. The sensing unit 102 then feeds a sensed signal through communication cable 104 to a processing module 106 that interprets the signal to determine that a label is present.

Figure 2:
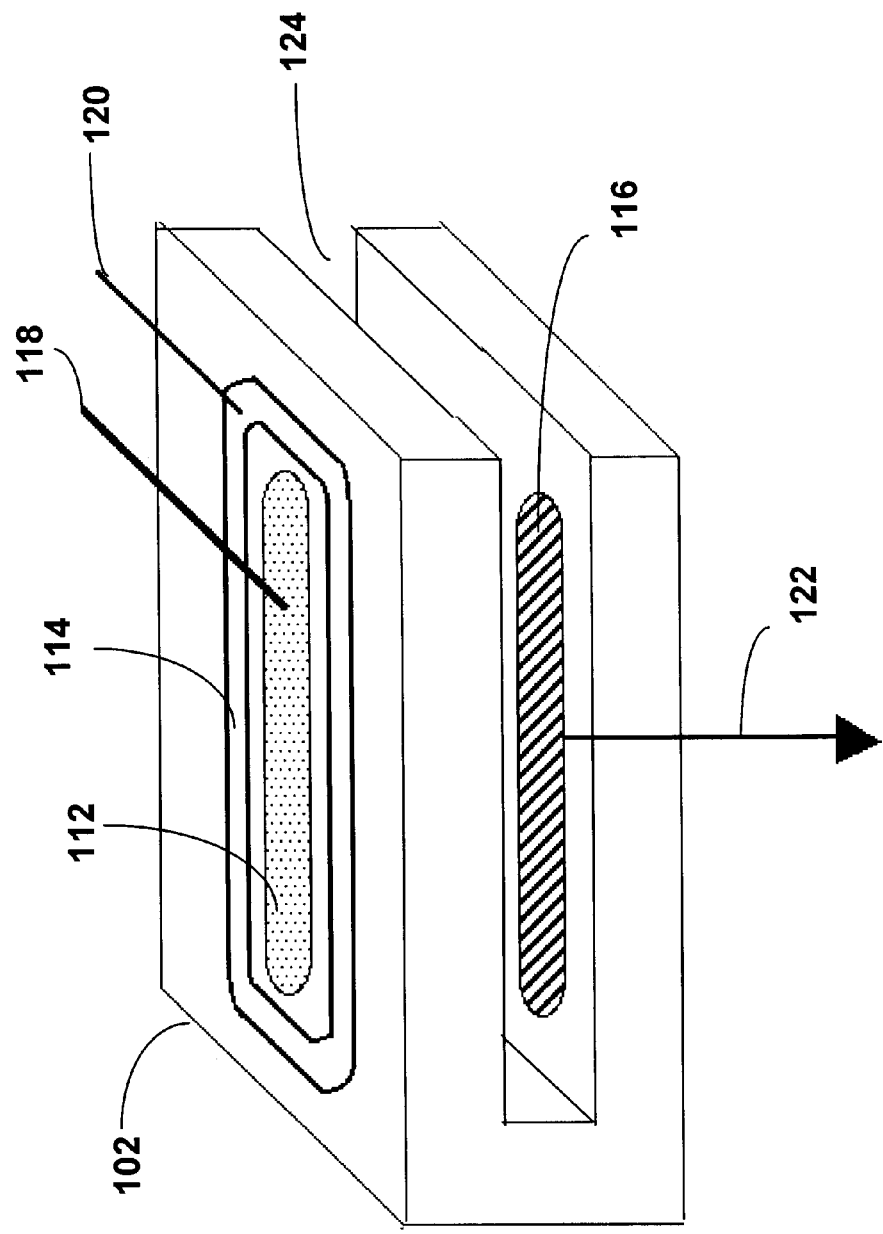
FIG. 2 shows the sensor unit's electrode configuration.

FIG. 2 illustrates some of the elements of the capacitive sensing unit 102. The sensing unit 102 includes a sensing electrode 112 that is surrounded by a shielding electrode 114. Though FIG. 2 illustrates the shielding electrode 114 surrounding the front, back, left, and right sides of the sensing electrode 112, the shielding electrode 114 will also cover the top of the sensing electrode 112 as well. A reference electrode 116 is positioned across the gap or opening 124 from the sensing electrode 112 and the shielding electrode 114 and is connected to ground 122.

The sensing unit 102 also includes electrical connection 118 that leads from the sensor electrode 112 to processing circuitry used to detect events from the change in signal occurring at the sensor electrode 112. Electrical connection 120 leads from the shield electrode 114 to driving circuitry used to eliminate mutual capacitance between the sensor electrode 112 and shield electrode 114.

Figure 3:
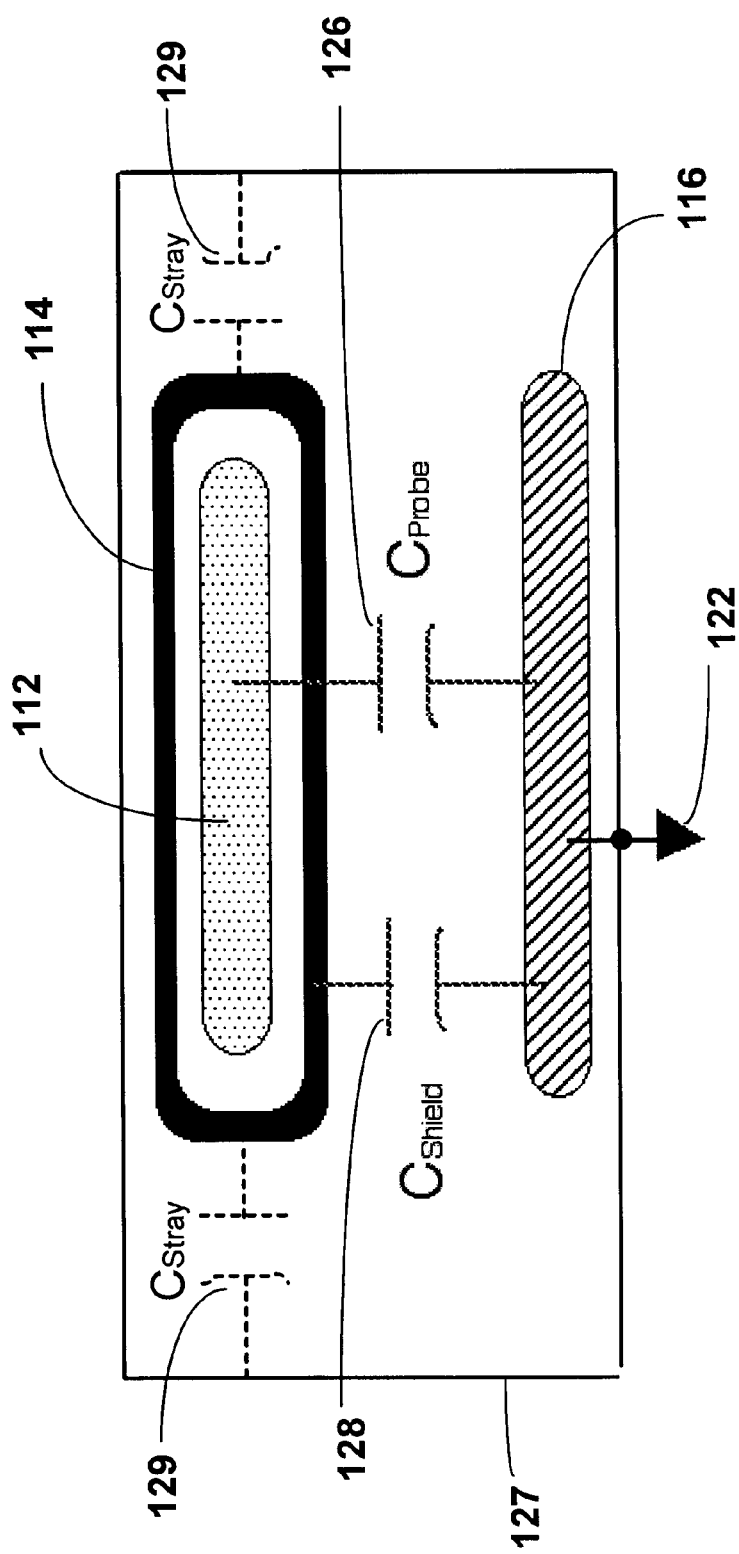
FIG. 3 depicts the sensor and shield capacitances.

FIG. 3. illustrates the effect of providing a sensing electrode and a shielding electrode. The separation of the sensing electrode 112 from the ground electrode 116 results in a capacitance 126 ($C_{Probe}$) which exists in the gap 124. A capacitance 128 ($C_{shield}$) exists in the gap 124 between the shielding electrode 114 and the ground electrode 116 and other undesired ground surfaces. $C_{shield}$ 128 differs from $C_{Probe}$ 126 because of the variance in the geometry and spacing of the shielding probe 114 from the ground probe 116 as compared to the geometry and spacing of the sensing probe 112 from the ground probe 116. Additionally, the capacitance experienced by the shield electrode 114 will differ from $C_{Probe}$ 126 because the shield electrode 114 will experience stray capacitance $C_{stray}$ between itself and other undesired ground surfaces such as a grounded metal housing 127 surrounding the electrodes. These additional capacitances are not experienced by the sensor electrode 112 due to the presence of the shielding electrode 114.

Driving the shielding electrode 114 with a voltage waveform having the same characteristics as the waveform applied to the sensor electrode 112 results in little or no mutual capacitance between the two electrodes. This effect is desirable because for proper label detection, the sensing electrode 112 must only be influenced by the material present in the gap. The electronics necessary for driving both the sensing electrode 112 and the shielding electrode 114 are described herein with reference to FIG. 4.

To sense the presence of a label or the label web, the sensing electrode 112 is periodically driven to a potential by the sensor electronics 130 through electrical conductor 118. The frequency of the voltage waveform is much greater than the highest frequency at which the labels will pass through the gap 124. This frequency is controlled by a system clock. A 2 MHz system clock resulting in a 2 MHz waveform is typical. The clock pulse is fed to a sensor dedicated monostable multivibrator 136 through line 140. The dedicated multivibrator 136 is also connected to line 118 which leads to the sensing electrode 112. Line 118 is also connected to a DC power source (not shown) through a resistor 138.

The multivibrator 136 discharges the capacitance 126 between the sensing electrode 112 and ground 116 upon receiving each clock pulse from line 140. The voltage at the sensing electrode 112 is reduced to ground potential or zero since the multivibrator completes a short to ground. The multivibrator then opens the discharge path and the voltage on the sensing electrode 112 begins to charge back toward the level of the DC power source. The rate of charge is governed by the time constant or product of the resistance of resistor 138 and the capacitance 126.

The capacitance 126 varies depending upon whether the label 110 is present in the gap or only the web 108 is present. If the label is present, the dielectric value increases which increases the capacitance. The resistance of resistor 138 stays the same so the time constant increases for the recharging of the potential on the sensing electrode 112. The multivibrator 136 produces an output pulse on line 104 whose width is determined by the rate at which the voltage recharges on the sensing electrode 112. Thus, the pulse width of the sensed signal output from the sensor unit 102 varies in proportion to the capacitance of the gap 124 created by the label 110 or the web 108. The pulse width modulated signal on line 104 is then fed to the processing module 106 for subsequent processing.

To isolate the sensing electrode 112 from noise sources such as surrounding areas of differing potentials, shielding electrode 114 is also driven to a similar potential with a resulting waveform of exactly the same frequency by a shield dedicated monostable multivibrator 132. The waveform is provided to the shielding electrode through electrical conductor 120.

To drive the shielding electrode 114 so that the mutual capacitance between the shielding electrode 114 and the sensor electrode 112 is minimized, the capacitance between the shielding electrode 114 and the ground electrode 116, as well as other stray capacitances experienced by the shield electrode 114, must be considered. Ideally, the recharging waveform of the shielding electrode 114 should replicate the recharging waveform of the sensor electrode 112 at all times.

To match the recharging waveforms, the time constants must be made equal and the recharge cycle for each must begin at precisely the same time. This synchronization is accomplished by feeding the shield dedicated monostable multivibrator 132 the same clock pulse 140 that is fed to the sensor dedicated monostable multivibrator 136. To match the time constants, the recharge resistor 134 connecting the dedicated multivibrator 132 and the shielding electrode 114 to the DC power supply (not shown) must be properly matched to the capacitance existing between the shielding electrode 114 and the ground electrode 116 and other undesired ground surfaces. Since $C_{Probe}$ does not equal the capacitance experienced by the shield electrode 114 including $C_{Shield}$ and $C_{Stray}$, the resistance of the shield recharge resistor 134 will not be equal to the resistance of the sensor recharge resistor 138.

Figure 4:
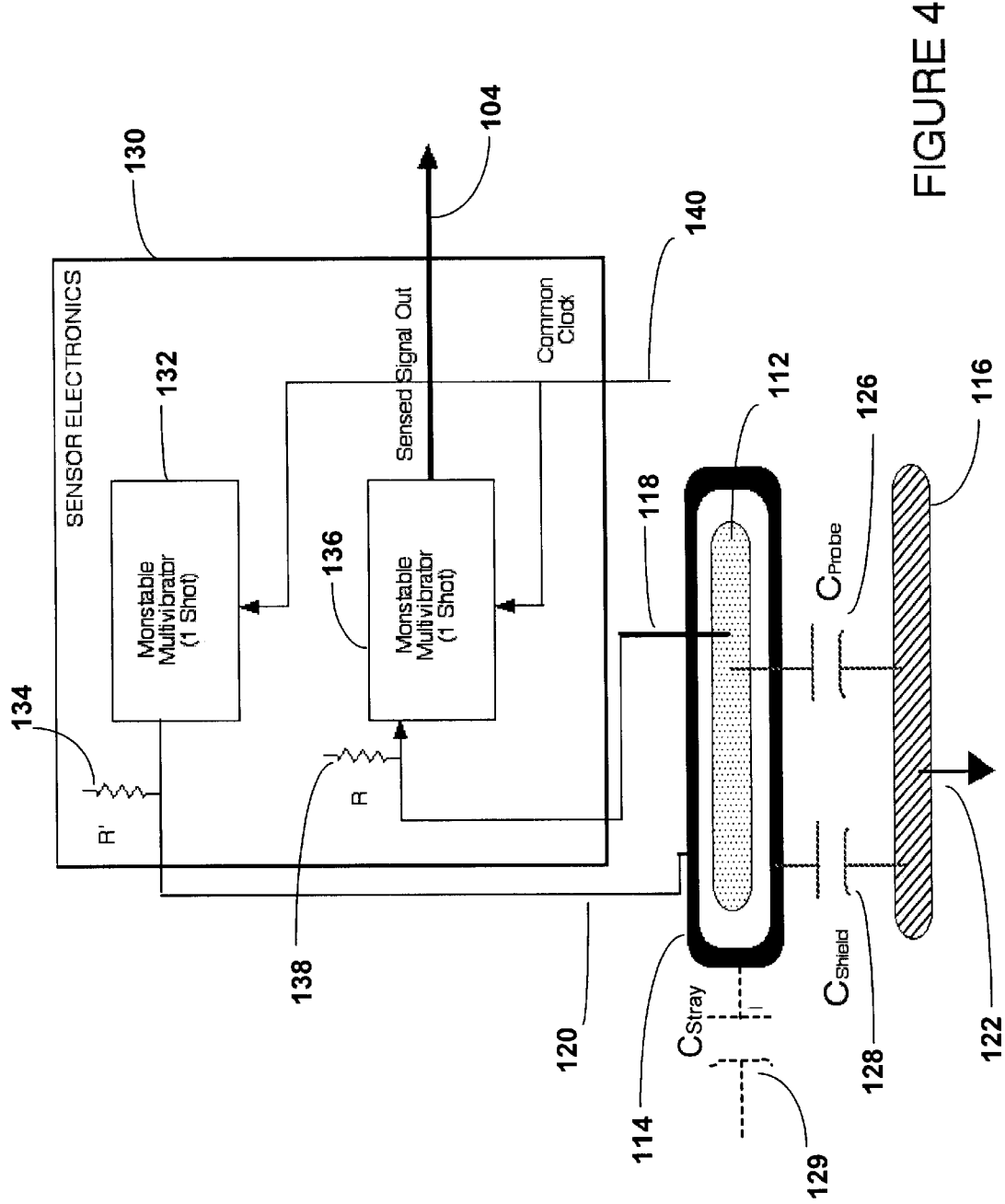
FIG. 4 illustrates the sensor unit's electronics.

The sensor electronics 130 of FIG. 4 permit the shield electrode 114 to be independently driven. The multivibrators 132 and 136 operate in unison to generate the independent signals and thereby prevent mutual capacitance from developing between the signal and shield electrodes. One skilled in the art will recognize that other methods of reducing the mutual capacitance are also available, such as using a buffer amplifier (i.e. voltage follower) to supply a potential to the shield electrode 114 that mimics the potential applied to the signal electrode 112, although the dual-multivibrator method is far superior in its ability to create an identical fast-slewing discharge slope.

Figure 5:
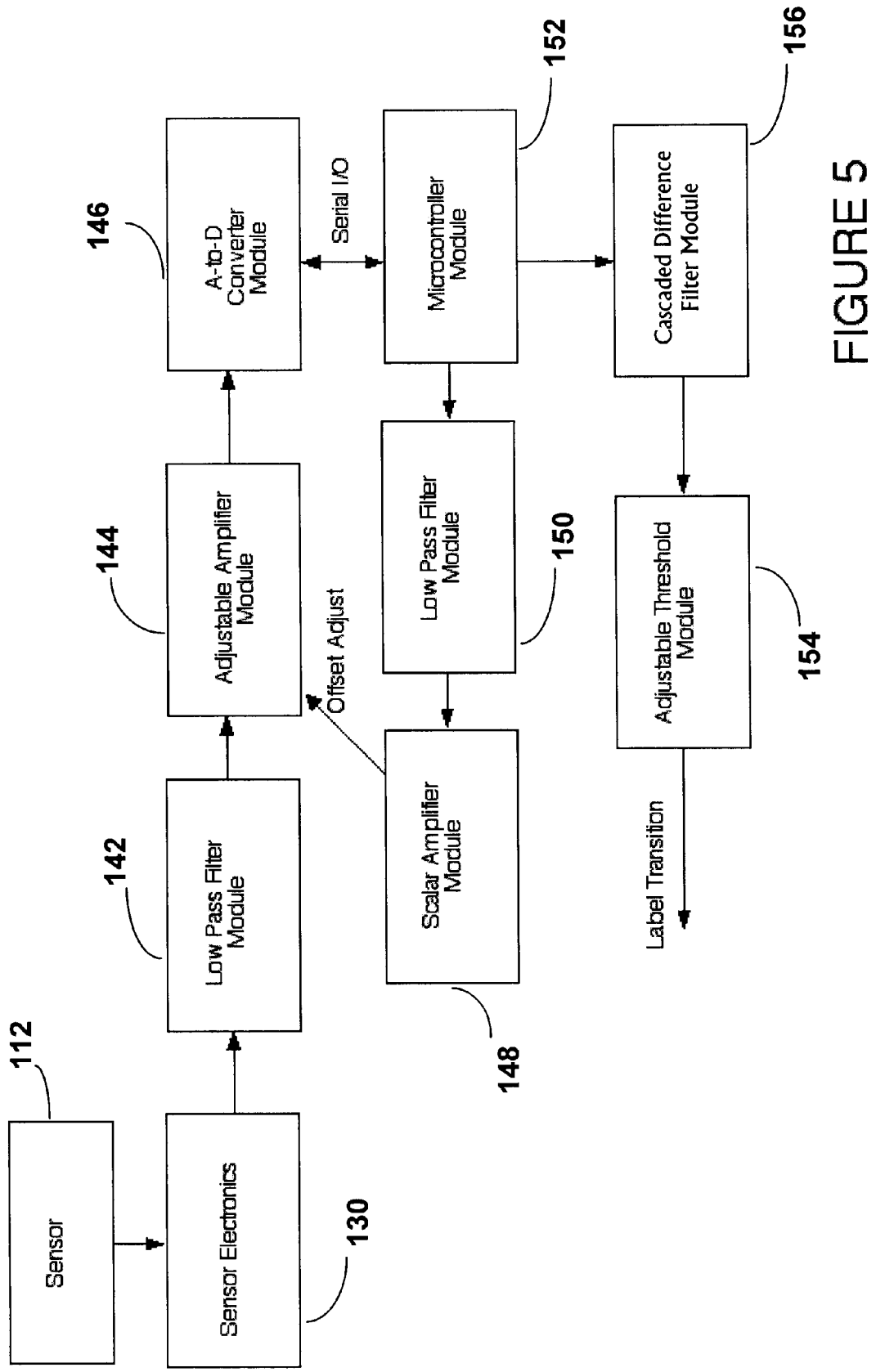
FIG. 5 is an electrical block diagram of the sensor unit and the processing module.

FIG. 5 illustrates the system electronics. The embodiments of the electronics of the invention described herein are implemented as logical operations in the detection system. The logical operations are implemented (1) as a sequence of computer implemented steps running on a computer system comprising the processing module and (2) as interconnected machine modules running within the computing system. This implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, analog circuits, and any combination thereof without deviating from the spirit and scope of the present invention as recited within the claims attached hereto. These operations may be implemented by instructions contained in a computer program product, such as programming stored on a storage media or transferred as a propagated signal. In the preferred embodiment, the modules described herein embody a microprocessor.

The sensor electrode 112 feeds its detection signal (i.e. the recharge signal) to the sensor electronics 130. The pulse width modulated periodic signal from the sensor electronics 130 travels to a low pass filter module 142 where it is then integrated into a varying DC analog output signal. The cutoff frequency of the low pass filter 142 is selected so that the high frequency content of the pulses is removed. The low frequency component which represents slow changes in the sensor capacitance passes through to create the varying DC signal.

The width of the pulse produced by the sensor electronics 130 varies depending upon the capacitance of the gap 124, which is governed by whether a label is present in the gap 124. If a label is present, the pulse width is greater than when only the web is present. The greater the pulse width, the greater the DC level of the signal output by the filter 142, which varies proportionally to the pulse width.

The varying DC signal travels to the adjustable amplifier module 144. This module 144 takes the DC signal and amplifies it to a greater level suitable for digitization. Ultimately, the system determines the presence of a label edge by determining whether the DC signal rises or falls. Amplifying the signal expands the rise or fall so that it is easily detected when digitized.

The amplified varying DC signal travels to an analog-to-digital (A/D) converter module 146 which samples the signal to produce a steady stream of discrete values indicating the amplitude of the varying DC signal at any sampling time. The discrete amplitude values are then output through a serial data bus into a microcontroller module 152.

The microcontroller module 152 receives the digitized stream of values representing the varying DC signal and then processes the signal to determine label edge transitions. The microcontroller 152 also automatically adjusts the offset voltage applied to the adjustable amplifier module 144 to compensate for voltage drift caused by changes in the ambient conditions, such as temperature and humidity, and changes in label stock. Additionally the microcontroller 152 automatically adjusts the threshold used to determine rising and falling signals to compensate for variation in overall signal levels caused by changes in label or web dielectric value. Therefore, the microcontroller 152 runs at least three processes contemporaneously, each of which is discussed herein. Alternatively, multiple microcontrollers could receive the digitized data to reduce the number of processes that must be performed by each one.

In one embodiment, the microcontroller 152 applies a cascaded difference filter module 156 to the digitized data to remove noise components so that the rise and fall of the varying DC signal is more easily detected. The operation of the cascaded difference filter will be discussed in greater detail below.

The microcontroller 152 automatically adjusts the threshold used by the cascaded difference filter 156 to determine the presence of a label edge by continuously analyzing the peak-to-peak amplitude of the varying DC signal. The automatic threshold adjustment function is performed by the adjustable threshold module 154. The operation of the adjustable threshold module 154 will also be discussed in greater detail below.

The microcontroller 152 also automatically adjusts the offset voltage that is applied to the adjustable amplifier module 144. The microcontroller 152 continuously analyzes the mean value of the varying DC signal to determine whether the offset is appropriate. The microcontroller 152 outputs a pulse width modulated signal whose pulse width varies depending upon the offset voltage error. If the microcontroller 152 determines that the adjustable amplifier 144 offset is either too high or too low, then it alters the width of the pulse that it generates. If the offset is too high, the pulse width is increased, and if the offset is too low the pulse width is decreased.

The PWM signal generated by the microcontroller 152 travels to another low pass filter module 150. The low pass filter 150 integrates the fixed frequency PWM signal down to a DC offset correction voltage. This low pass filter 150 has a cutoff frequency that is set so that the high-frequency content of the PWM signal is removed. Therefore, a 0% duty cycle signal (no pulse) results in a ground level DC offset correction voltage output, and a 100% duty cycle signal (full width pulse) results in a maximum level DC offset correction voltage output.

The DC offset correction voltage created by the low pass filter 150 is fed to a scalar amplifier module 148 that amplifies the DC offset correction voltage to an amount suitable to correct the offset voltage error of the adjustable amplifier 144. The adjustable amplifier 144 receives the amplified DC offset correction voltage and adds it to the varying DC signal before it is output to the A/D converter 146. The offset adjustment process is discussed in greater detail below. The low pass filter 150 and scalar amplifier 148 and microcontroller 152 operate together to form an offset adjusting module.

Figure 6:
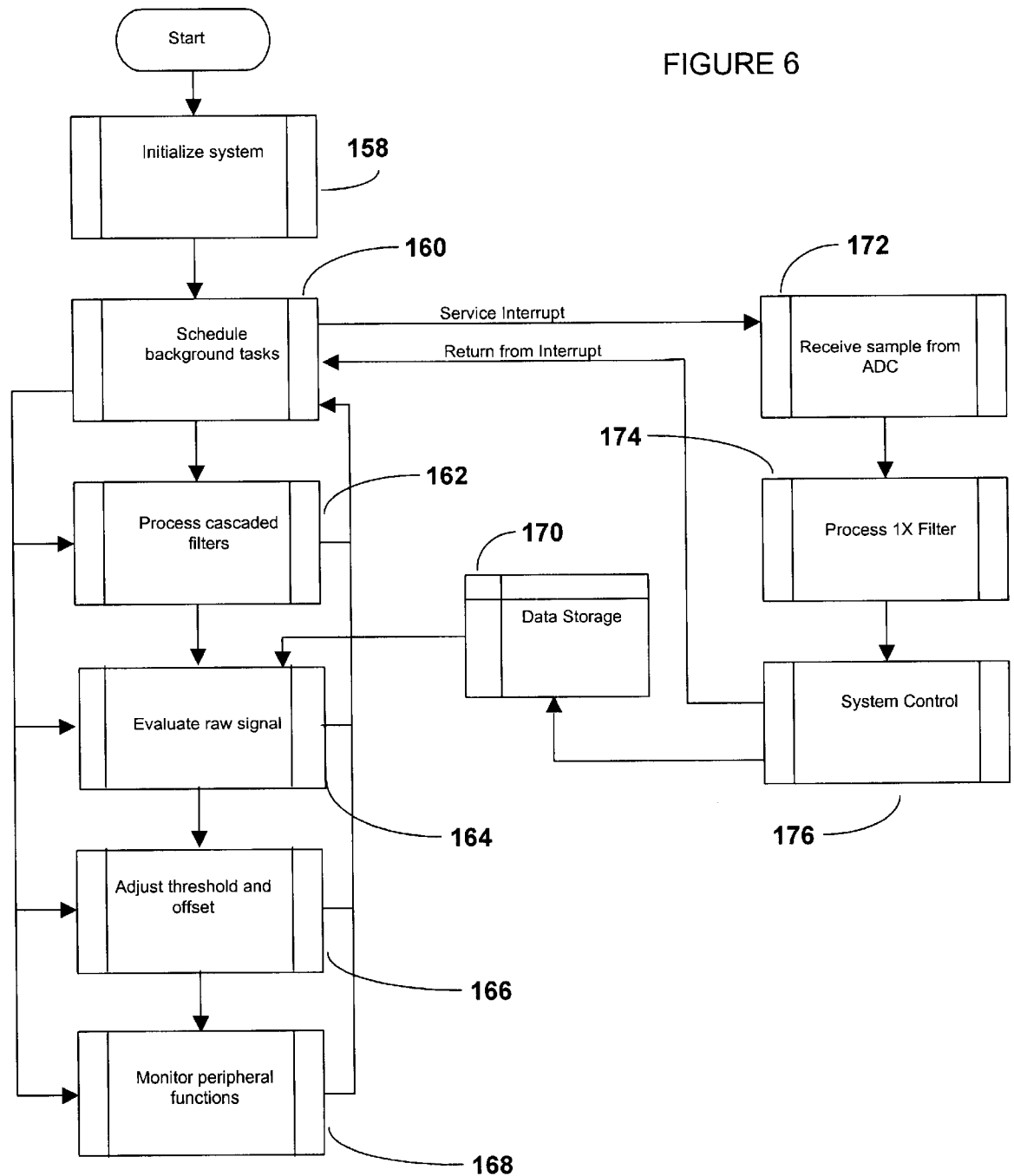
FIG. 6 illustrates the operational flow for the data acquisition and automatic adjustment processes.

FIG. 6 illustrates the operational flow of the data acquisition and background routines performed by the microcontroller 152. At operation 158, the system becomes initialized so that it is ready to begin receiving, processing, and storing data from the A/D converter. Operation 160 includes scheduling background tasks so that once data is received, the microcontroller 152 can begin to automatically adjust the threshold and offset and apply the cascaded difference filters. Once these tasks are scheduled, a service interrupt is provided to operation 172 which begins to receive data samples from the A/D converter.

Process operation 174 then applies a 1x (every sample) difference filter, discussed below, to remove the DC component from the data, and look for signal transitions. Once the difference filter has generated output, control operation 176 feeds the output into storage at store operation 170. Control operation 176 sends a return from interrupt back to schedule operation 160. The background routine begins once the return from interrupt signal is received.

During the background routine, Process operation 162 applies the cascaded difference filters to the data being provided by the A/D converter. The cascaded difference filters look for signal transitions and generate a digital pulse whose rising and falling transitions correspond to the presence of leading and trailing label edges.

The background routine also involves evaluate operation 164 which receives the raw signal data that has been filtered and stored. This operation analyzes the data to determine several specific values that are subsequently used to adjust the threshold and offset voltages in operation 166. During the background routine, monitor operation 168 continuously oversees the processing, evaluation, and adjustment tasks and flags the schedule operation 160 when a problem occurs.

Figure 7A:
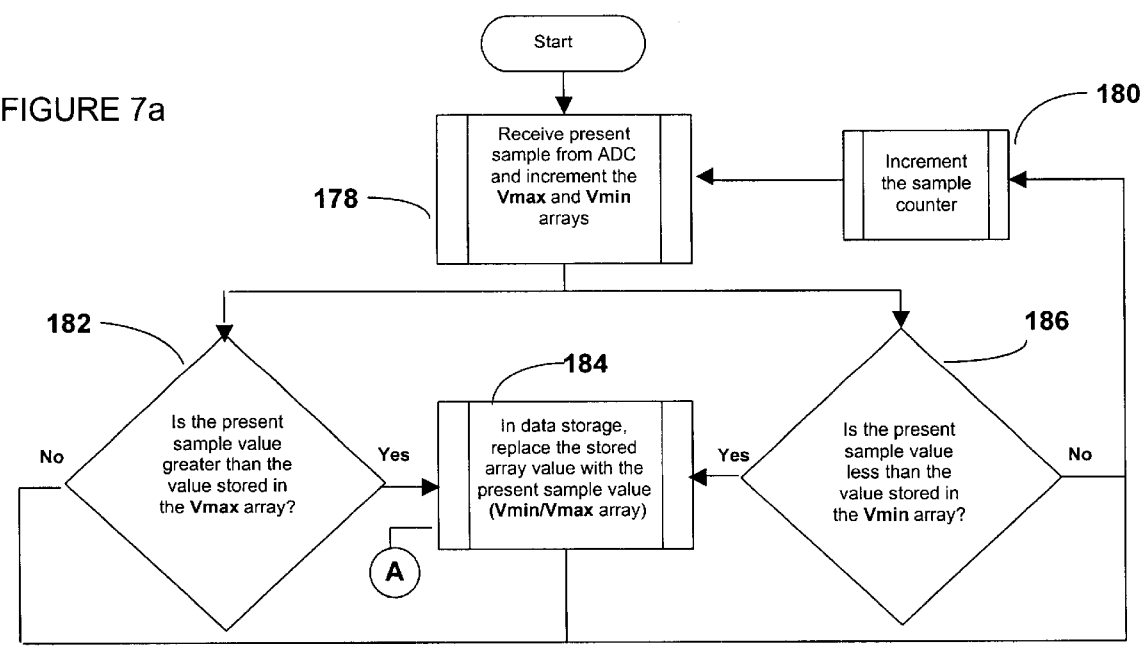
FIG. 7a shows the operational flow of the data acquisition process in greater detail.

FIG. 7a depicts the signal sampling, data accumulation, and raw data evaluation routine in more detail. This routine derives the data that is used to determine the raw signal's amplitude and its relative position between ground and the amplifiers voltage rail.

Receive operation 178 begins to accept data through the serial I/O bus from the A/D converter and stores the digitized voltage levels in data arrays. One data array (Vmax) contains the highest signal levels detected by operation 182 since the beginning of an adjustment interval and another array (Vmin) contains the lowest signal levels detected by operation 186 since the beginning of an adjustment interval.

Query operation 182 detects whether the present sample is greater than the value stored in the Vmax array. If so, the value stored in the Vmax array is replaced with the current value at replace operation 184. Then increment operation 180 increases the sample counter by 1. The sample counter tracks the number of samples processed during a given adjustment interval. If the current value is not greater than the Vmax value, then control moves directly to increment operation 180.

Figure 7B:
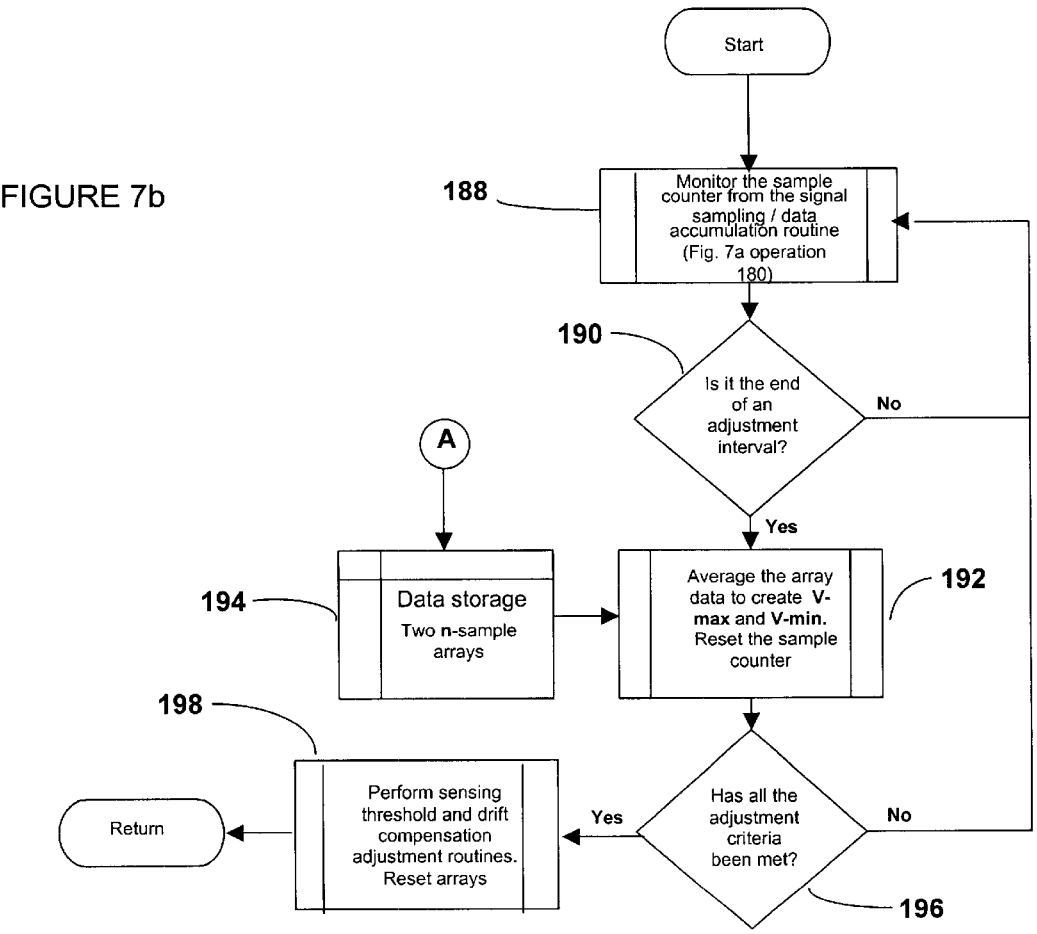
FIG. 7b depicts the operational flow of the automatic adjustment process in greater detail.

Query operation 186 detects whether the present sample is less than the value stored in the Vmin array. If so, the value stored in the Vmin array is replaced with the current value at replace operation 184. This query operation occurs in parallel with query operation 182 so that control moves from either query operation to increment operation 180 at the same time. Also, once these query operations and replace operation 184 are finished, the data received is stored at storage operation 194 of FIG. 7b.

The Vmax and Vmin arrays accumulate the highest and lowest signals sampled during the adjustment interval. At the end of each interval, which is detected by operation 188 monitoring the sample counter and query operation 190 determining that the sample counter has reached its target, the data stored at operation 194 in the Vmax array is averaged at operation 192, as is the data stored in the Vmin array, to produce an average Vmax and an average Vmin. These values are used in both the automatic threshold and automatic offset voltage adjustments.

Query operation 196 detects whether all of the adjustment criteria has been met, which includes determining that average values for both Vmax and Vmin are known. If they are not known, the control returns to monitor operation 188 which looks for the end of the next adjustment interval. If they are known, then control moves to perform operation 198 where both the threshold and offset routines are then performed and the arrays are reset. The process then repeats which allows the sensor to continually optimize the threshold and offset settings based on data from the previous adjustment interval.

Figure 8:
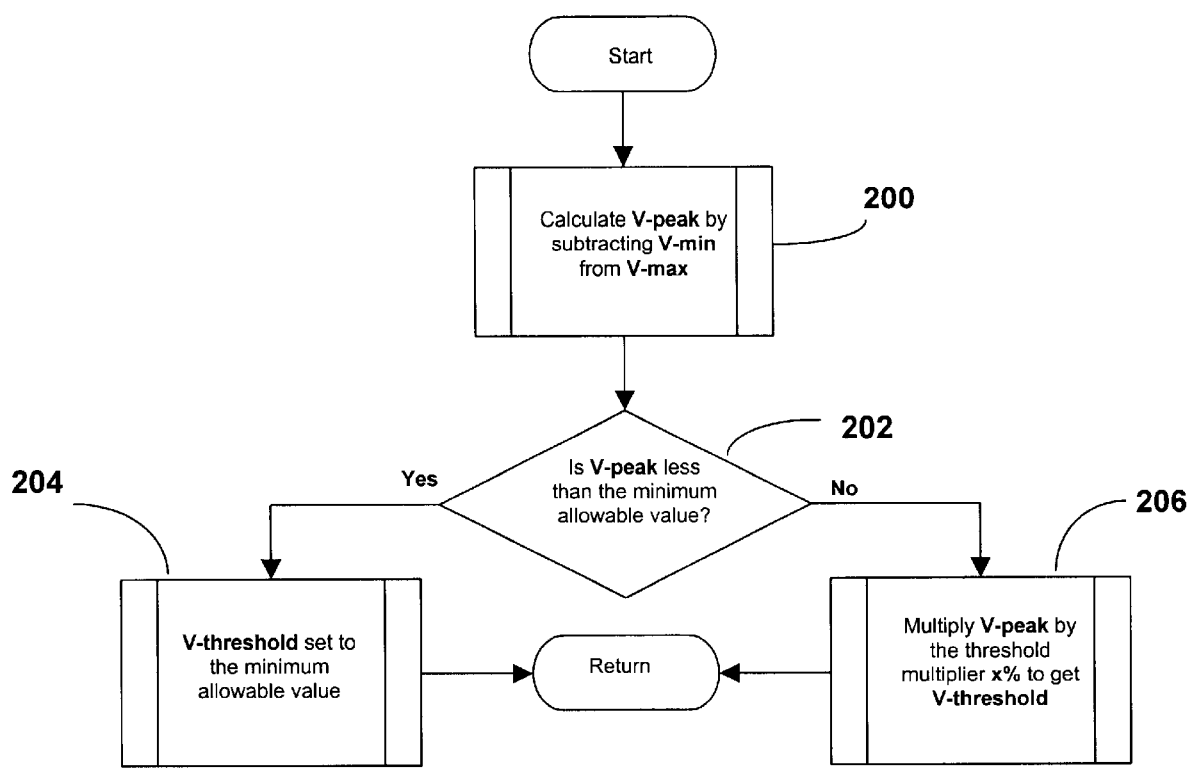
FIG. 8 illustrates the operational flow of the automatic threshold adjustment process.

The process for automatically adjusting the threshold value used to detect a rising or falling transition is depicted in FIG. 8. This threshold adjustment routine sets the threshold at a desired percentage of the peak-to-peak raw signal amplitude to optimize the threshold for the raw signal level. This method maintains a high degree of noise immunity over a wide range of input signal amplitudes.

At calculate operation 200, the peak-to-peak raw signal amplitude (Vpeak) is found by subtracting the average Vmin value previously determined from the average Vmax value that was also previously determined. Once Vpeak is known, query operation 202 detects whether Vpeak is less than the minimum allowable value. This operation is necessary because the threshold voltage must remain at least above a minimum level regardless of the Vpeak to avoid noise interference. If query operation 202 detects that Vpeak is below a minimum value, adjust operation 204 sets the threshold voltage to its minimum value.

If query operation 202 detects that Vpeak is above or equal to its minimum value, flow moves to adjust operation 206. Here, the threshold voltage is obtained by multiplying Vpeak, the peak-to-peak raw signal amplitude, by the desired percentage to produce the appropriate threshold. The threshold voltage has no upper limit other than the limit indirectly imposed by the potential difference between ground and the voltage rail of the amplifier module 144. After the threshold voltage is adjusted, operational flow returns to await the calculation of the next average Vmin and Vmax values. The system continuously optimizes the threshold voltage for variances in the raw signal amplitude in this manner.

Figure 9:
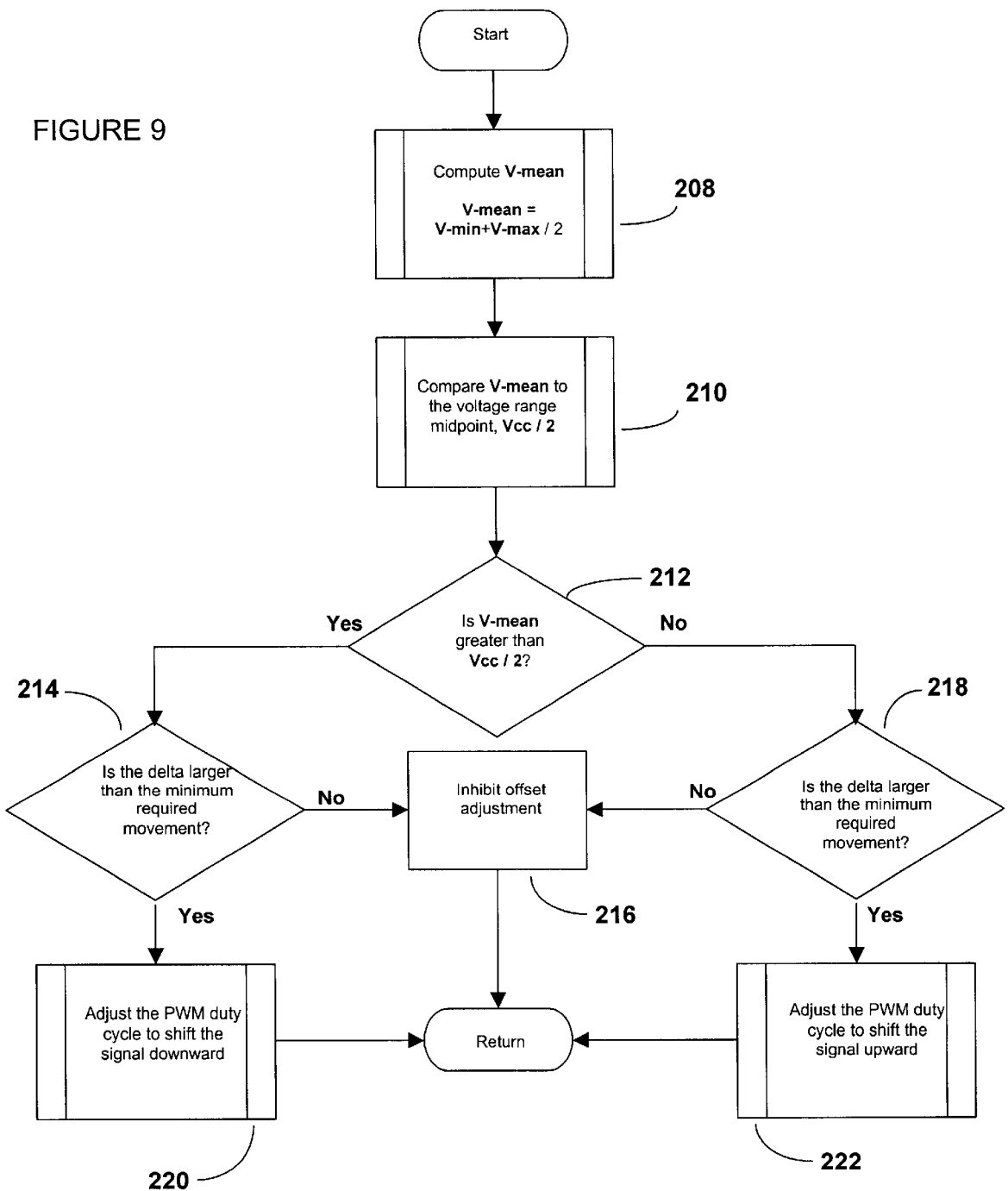
FIG. 9 shows the operational flow of the automatic offset adjustment process.

FIG. 9 shows the operation flow of the automatic offset, or drift compensation routine. This routine permits the system to maintain the mean signal level Vmean centered between the voltage rail of the amplifier module 144 and ground. Centering Vmean in this way allows maximum signal compliance and measuring accuracy. This routine compensates for amplifier output voltage drift that occurs as a result of changes in the ambient conditions including humidity and temperature, or the dielectric constant of the label which may change from web to web.

Calculate operation 208 begins the routine by computing Vmean. The average Vmin previously determined is added to the average Vmax also previously determined. This sum is divided by two to find Vmean. Compare operation 210 subtracts the Vmean value from the amplifiers voltage rail value divided by two. Query operation 212 detects whether Vmean is greater than the voltage rail divided by two. If so, then flow moves to query operation 214 to test whether the difference between Vmean and the voltage rail divided by two is larger than a chosen minimum adjustment value.

If the difference is not larger than the chosen minimum, then no offset adjustment is required because Vmean is sufficiently centered between the voltage rail of amplifier module 144 and ground. Therefore, inhibit operation 216 maintains the PWM duty cycle and the routine returns to the beginning where it awaits the next Vmin and Vmax. If query operation 214 detects that the difference is larger than the chosen minimum, then adjust operation 220 increases the duty cycle of the PWM signal being sent to the low pass filter 150 which results in an offset adjustment that lowers Vmin and Vmax when an inverting amplifier 144 is used to magnify the signal. A non-inverting amplifier 144 could be used as well, in which case the duty cycle of the PWM waveform would be decreased to decrease Vmin and Vmax. The offset amount applied is the amount necessary to make (Vmin+Vmax)/2=Vcc(voltage rail)/2.

If query operation 212 detects that Vmean is not greater than Vcc/2, then query operation 218 tests whether the difference is larger than the chosen minimum required. If the difference is not larger, then Vmean is sufficiently centered and inhibit operation 216 maintains the PWM duty cycle and the routine returns to the beginning where it awaits the next Vmin and Vmax. If the difference is larger, then adjust operation 222 decreases the duty cycle of the PWM waveform that results in an increase in Vmin and Vmax when the amplifier 144 is inverting. Again, a non-inverting amplifier 144 could be used as well, in which case the duty cycle of the PWM waveform would be increased to increase Vmin and Vmax. The offset amount applied is again the amount necessary to make (Vmin+Vmax)/2=Vcc/2.

Figure 10:
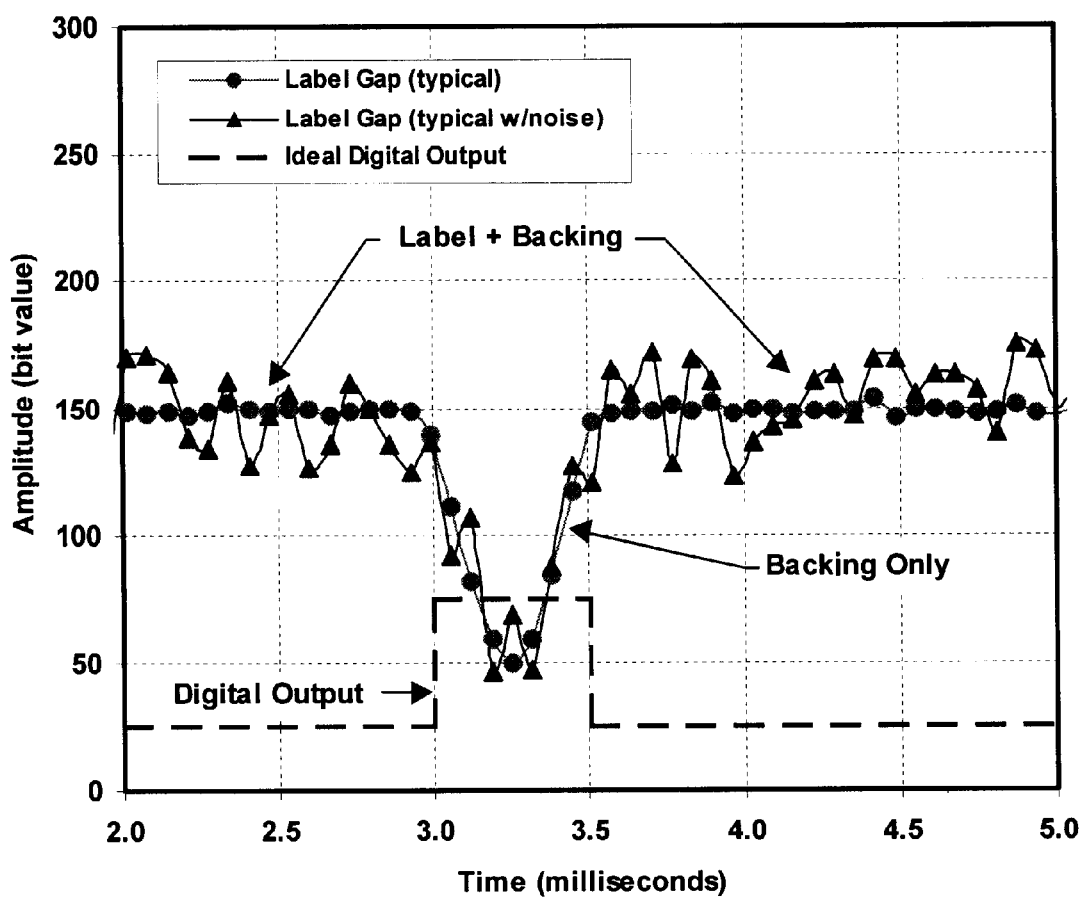
FIG. 10 shows the label detection signal with and without noise and also shows the ideal digital output signal that results.

FIG. 10 illustrates a typical waveform that results from a label to web to label transition. The line with the round data point markers shows a typical waveform in the presence of virtually no background noise. As can be seen, the signal level is high when the capacitance is high due to the presence of both the label and its supporting web. When the label moves out of the gap 124 so that only the web is present, the capacitance decreases and the signal level falls. Then, a new label enters the gap 124 and the signal level rises back to a high state.

The waveform with triangular data points depicts the signal when background noise is present, and the dashed line shows the ideal digital output produced by the processing module in response to the digitized input waveform. The ideal digital output indicates that the pulse goes high when the signal falls below the threshold and the pulse returns to the low state when the signal rises above the threshold. The system may be configured so that the falling signal threshold and the rising signal threshold are not equal. Also, it should be noted that the time frame of the label to web to label transition, depicted as 0.5 milliseconds, can vary greatly in operation. Typically, start up and shut down cycles, where the web is accelerating from rest or decelerating to rest, can cause label transition durations to vary from normal operating speed durations by a factor of 1000.

Detecting both the leading and trailing edges of the waveforms is desirable. Analog components can detect these edges but due to the variance in operating speed from rest to normal, it requires a system that can differentiate the transitions from near DC to high frequencies. Analog components cannot easily differentiate across such a broad bandwidth and are also very sensitive to ambient conditions. Therefore, digital filters are preferred in finding the transitions.

One technique for locating transitions in a signal is to quantify the change in the signal from sample to sample by subtracting adjacent data values. This subtraction (or difference) can be implemented through a digital finite impulse response filter. The basic equation describing this filter is $$y(t) = \sum_{n=0}^{n=(N-1)} h(n) \cdot x(t-n)$$

Figure 11:
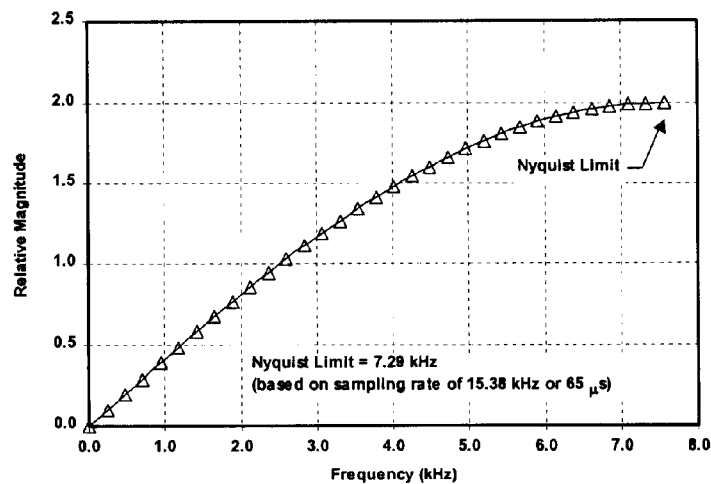
FIG. 11 illustrates the frequency passband characteristics for a 1× difference filter.

In this equation, x(t) represents the input waveform and y(t) represents the output waveform that has been filtered. N represents the total number of filter coefficients to be convolved with the input waveform. The filter coefficients are h(n). The filter coefficients corresponding to subtracting adjacent data values (to be referred to as a "1×" difference filter) are shown in Table 1 and the resulting amplitude values are shown in the passband plot of FIG. 11 (assuming a 65 microsecond sampling interval).

TABLE 1

| 1× Differencing Filter Coefficients | |
| --- | --- |
| Array number (n) | 1× difference filter coefficients h(n) |
| 0 | 1 |
| 1 | −1 |

The 1× difference filter is a fast filter because it accounts for every data sample point in the signal. As can be seen, the frequency plot of this filter slopes positively with increasing frequency from zero to the Nyquist sampling limit that equals one half of the sampling frequency. At DC, the passband amplitude is zero, and the passband amplitude peaks at the Nyquist limit.

Figure 12:
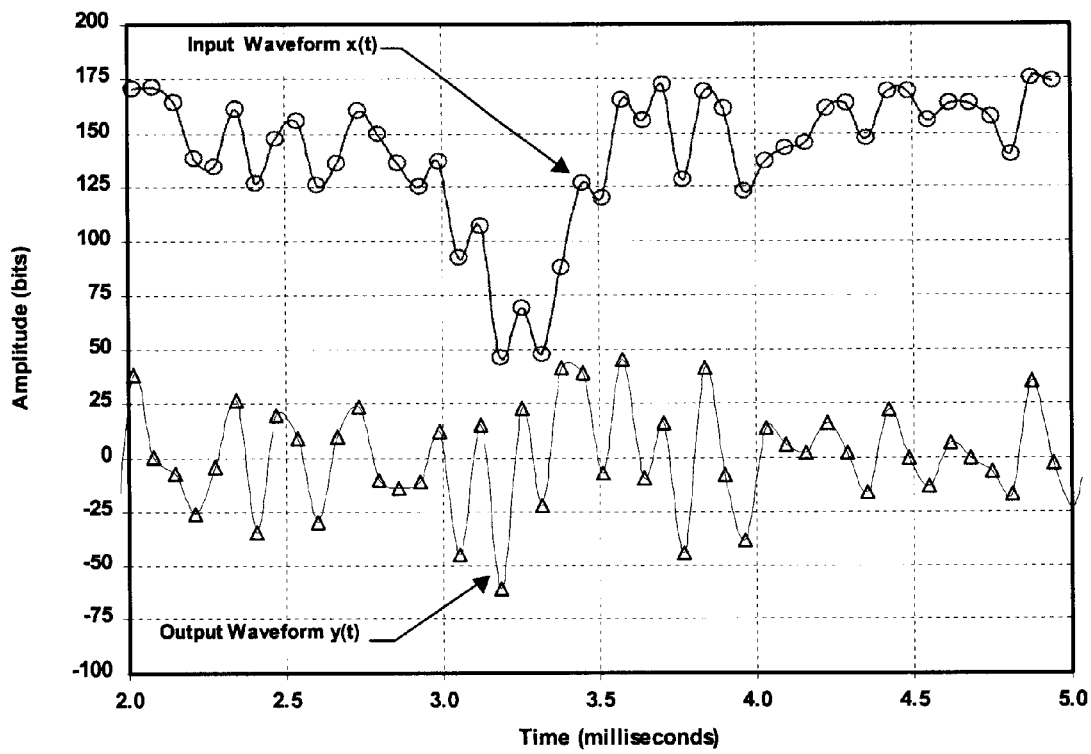
FIG. 12 depicts the input waveform of a label sensor and the resulting output waveform after application of the 1× difference filter.

FIG. 12 shows the input waveform for a label to web to label transition with background noise present. Also shown in FIG. 12 is the output of the 1× difference filter applied to the input waveform. The DC component is removed by the filter but the transitions cannot be resolved because the filter is too fast. To slow down the filter, the interval between samples considered by the filter are lengthened by only looking at data points spaced farther apart. For example, instead of taking the difference between every data point, the difference between every fourth data point can be taken instead. This filter is known as a 4× filter. Its coefficients are shown in Table 2.

TABLE 2

| 4× Difference Filter Coefficients | |
|---|---|
| Array number (n) | 4× difference filter coefficients h(n) |
| 0 | 1 |
| 1 | 0 |
| 2 | 0 |
| 3 | 0 |
| 4 | −1 |
| 5 | 0 |
| 6 | 0 |
| 7 | 0 |

Figure 13:
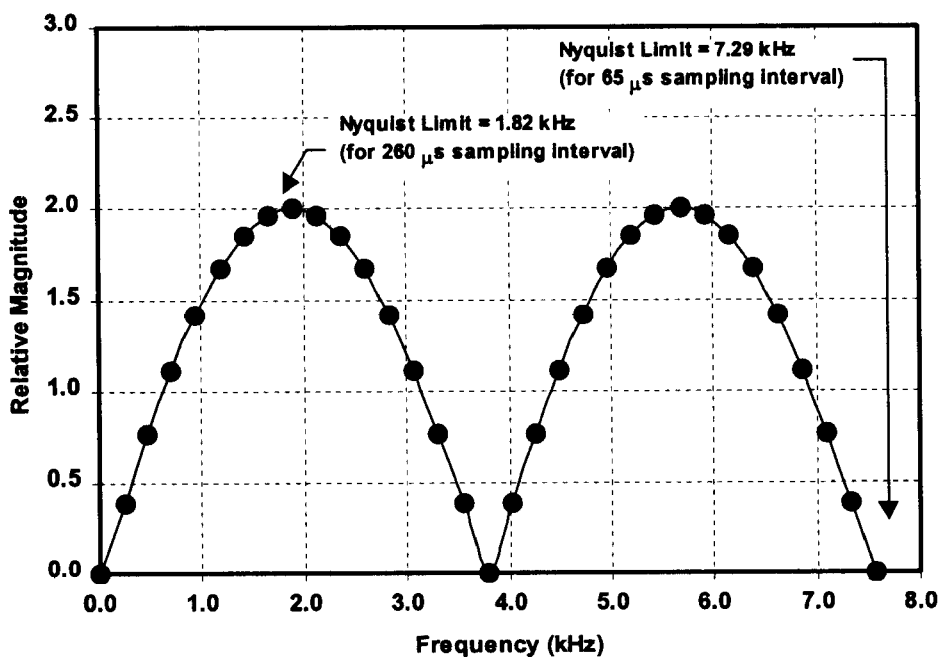
FIG. 13 depicts the frequency passband characteristics for a 4× difference filter.
Figure 14:
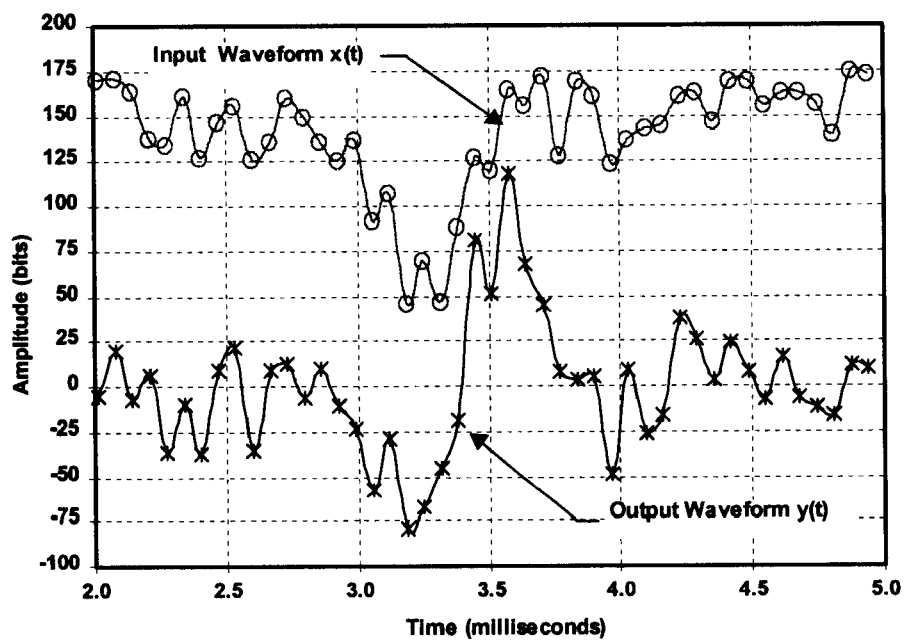
FIG. 14 shows the input waveform of a label sensor and the resulting output waveform after application of the 4× difference filter.

The frequency characteristic for the 4× filter (assuming a 65 microsecond sampling interval) are shown in FIG. 13. As can be seen, the 4× filter provides two passbands from DC to Nyquist limit. The effect of the 4× filter on the input waveform can be seen in FIG. 14. The rise and fall transitions are now more apparent. However, high frequency noise remains in the output signal. Ordinarily, the bandwidth of the input signal for 4× filter should be limited to one-fourth of the Nyquist limit to prevent high frequency noise from discoloring the output. The input waveform corresponding to the output waveform of FIG. 14 was bandwidth limited by the 1× filter, which only requires that the band be limited to the Nyquist limit (with the Nyquist limit being defined as the sampling interval of the 1× differencing filter or the rate at which the input waveform is being sampled). To limit the bandwidth for the 4× filter, the input coefficients can be modified to causes the filter to also act as a low pass filter. Adjusting the filter so that a running average of the original waveform is performed before the subtractions are made will establish the low pass effect. This running average can be done by making the coefficients equal to one-fourth of the value used when no averaging is performed. The averaging coefficients are shown in Table 3.

TABLE 3

| 4× Differencing Filter Coefficients (with averaging) | |
|---|---|
| Array number (n) | 4× difference filter coefficients h(n) |
| 0 | 0.25 |
| 1 | 0.25 |
| 2 | 0.25 |
| 3 | 0.25 |
| 4 | −0.25 |
| 5 | −0.25 |

TABLE 3-continued

| 4× Differencing Filter Coefficients (with averaging) | |
|---|---|
| Array number (n) | 4× difference filter coefficients h(n) |
| 6 | −0.25 |
| 7 | −0.25 |

Figure 15:
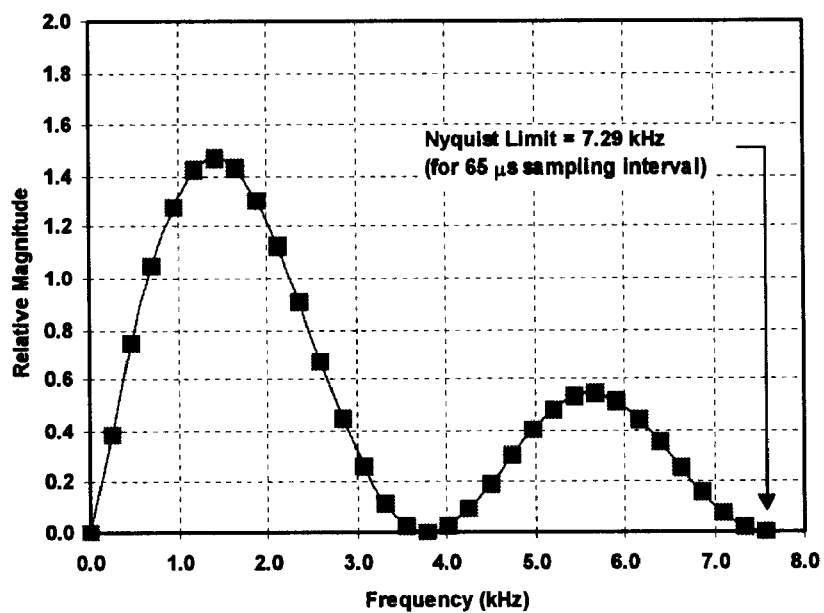
FIG. 15 illustrates the frequency passband characteristics of a 4× difference filter using averaging FIG. 16 the input waveform of a label sensor and the resulting output waveform after application of the 4× difference filter using averaging.

The passband characteristics of the 4× filter with averaging can be seen in FIG. 15. The two passbands are still provided up to the Nyquist limit but both passbands' amplitudes are reduced. The higher frequency passband's amplitude is greatly reduced relative to the lower frequency passband's amplitude.

Figure 16:
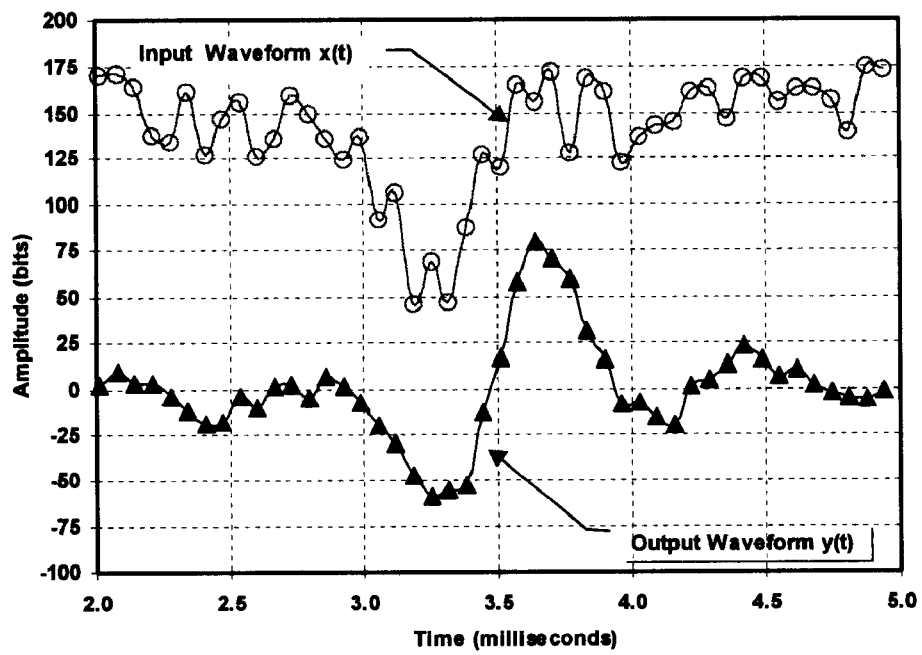

FIG. 16 shows the input waveform and the waveform output by the 4× difference filter using averaging. The transition thresholds are still apparent and the high frequency noise is greately attenuated. The high frequency noise's amplitude is well below the level necessary to trigger a false label edge detection.

Implementing this averaging technique digitally is difficult because the input waveform's data points must be buffered over a long period of time. To minimize the amount data that must be buffered while averaging, the system can be configured to compute a cumulative average rather than a running average. A running average is one that is updated with each new data point. A cumulative average is one that combines successive data points into a single value. Rather than storing each data point's value, the average for every four consecutive data points can be stored for comparison to the average of the next four consecutive data points for example. The output waveform produced by the filter using cumulative averaging will be every fourth data point of the output waveform produced by using running averaging.

Figure 17:
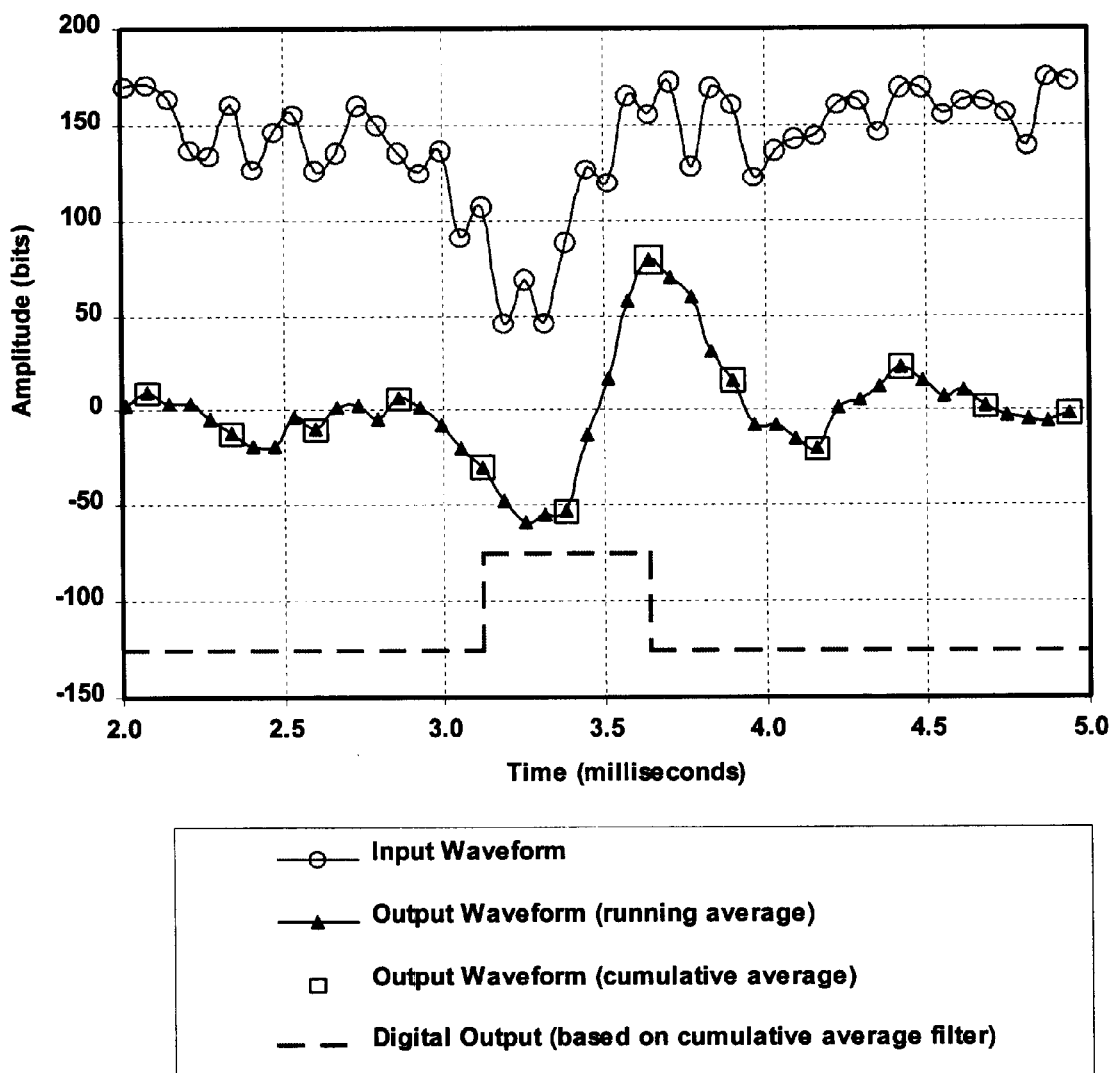
FIG. 17 depicts the input waveform of a label sensor, the output waveform as a running average the output waveform as a cumulative average, and the digital output based on the cumulative average output.

FIG. 17 illustrates the input waveform, the running average output waveform, the cumulative average output waveform, and the digital output waveform based on the cumulative average filter. The cumulative average waveform contains one-fourth as many data points as the running average waveform but still provides sufficient granularity to detect the rise and fall transition thresholds. The digital output is triggered high when the fifth cumulative averaging data point's amplitude is below the falling threshold. The digital output is triggered back to low when the seventh cumulative averaging data point's amplitude is above the rising threshold.

Employing the cumulative averaging technique allows the system to implement the digital filter more quickly while requiring less memory usage. These two effects permit numerous difference filters of varying "speeds" to be cascaded. Using numerous filters provides the maximum bandwidth for evaluating the signals, and start up and shut down accelerations and decelerations on the web do not cause the label edges to become undetectable. Cascading the filters can also prevent false detections due to aliasing.

Figure 18:
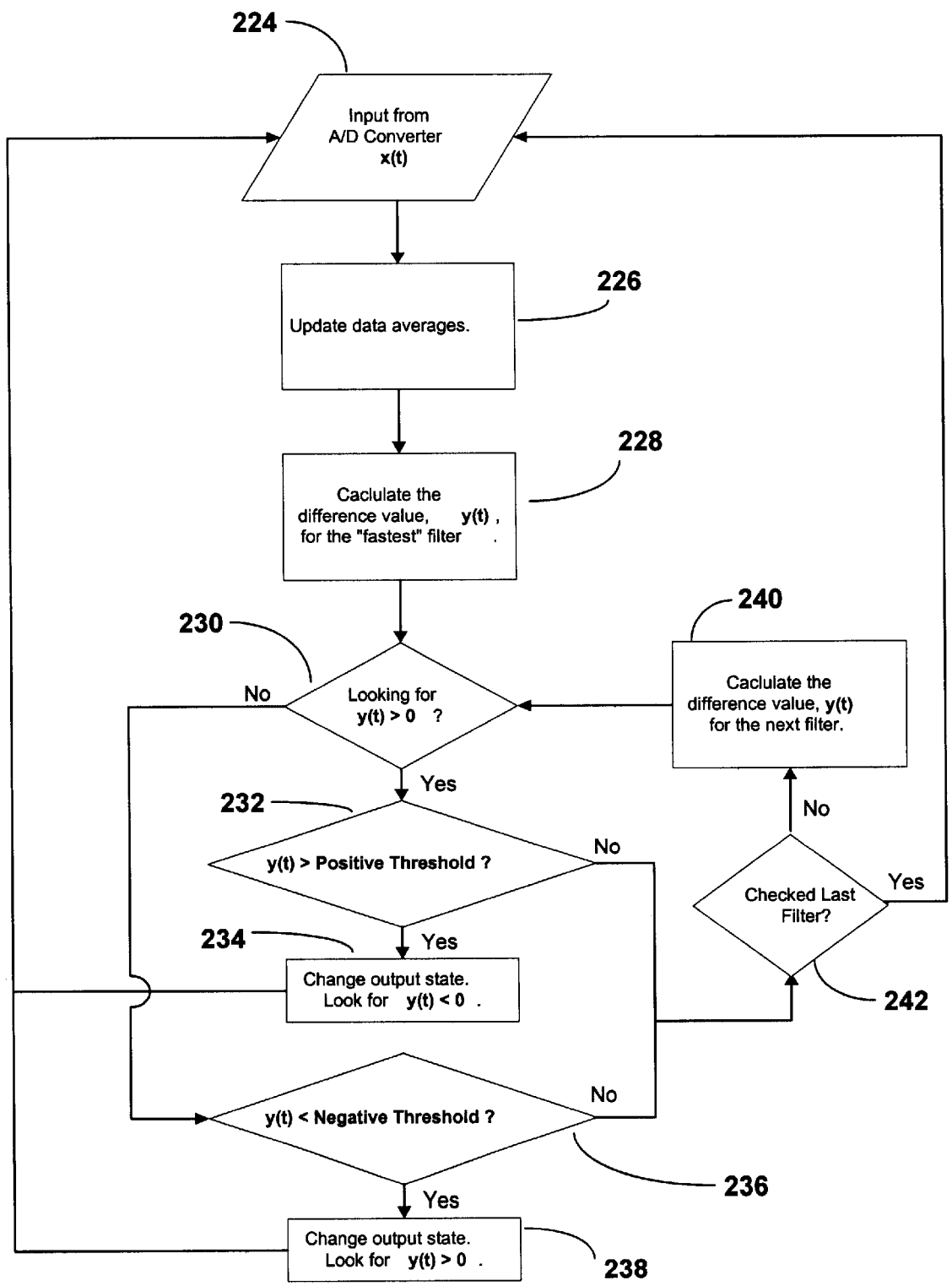
FIG. 18 shows the operational flow of a cascaded difference filter.

FIG. 18 illustrates the operational flow for the cascaded difference filter architecture and routine. At input operation 224, the filter receives input data x(t) from the A/D converter. The analog bandwidth limit of the A/D input signal x(t) is specified by the sampling interval for acquiring data from the A/D converter.

Once data is received, update operation 226 updates the average output value for each of the time intervals under consideration. Difference operation 228 calculates the difference value y(t), as previously described, for the fastest filter being used. Query operation 230 evaluates whether a positive or negative transition is currently required to change the output state. If looking for a positive transition, then query operation 232 tests whether y(t) is greater than the positive or rising threshold.

If y(t) is greater than the positive threshold, then state operation 234 changes the output state of the system to indicate a leading edge transition. Then control returns to input operation 224. If y(t) is not greater than the positive threshold, then query operation 242 detects whether the last filter has been checked. If so, then control returns to input operation 224. If not, the filter operation 240 calculates y(t) as previously described for the next fastest filter, and then control returns to query operation 230.

Back at query operation 230 for the first pass, if looking for a negative going transition (y(t)<0), then flow moves to query operation 236 to test whether y(t) is less than the negative or falling threshold. If it is, then state operation 238 changes the output state of the system to indicate a trailing edge transition, and control returns to input operation 224. If y(t) is not less than the negative threshold, then flow moves to query operation 242 to determine whether the last filter has been checked. If so, control returns to input operation 224. If not, control moves to filter operation 240 which calculates y(t) for the next fastest filter. Then control returns to query operation 230.

While the invention has been particularly shown and described with reference to preferred embodiments thereof, it will be understood by those skilled in the art that various other changes in the form and details may be made therein without departing from the spirit and scope of the invention.

We claim:

1. A method for detecting a change in an output signal having a level that fluctuates in response to an external event, the method comprising:

amplifying the output signal using an amplifier to generate a sensed signal;

continually adjusting an offset voltage which is applied to the amplified output signal to maintain a mean value of the sensed signal at a desired voltage;

detecting an occurrence of the external event by detecting when the sensed signal changes to a value greater than a threshold value; and continually adjusting the threshold value used to detect the occurrence of the external event to maintain the threshold value at a desired percentage of a maximum range of sensed signal values.

2. The method according to claim 1, wherein sensing circuitry is responsive to the external event, the method further comprising:

receiving from the sensing circuitry a periodic signal having a characteristic that varies when the external event occurs; and filtering the periodic signal using a low-pass filter to generate the output signal.

3. The method according to claim 2, wherein the sensing circuitry is part of a label sensor and includes a first reference electrode, a second reference electrode, and electronic driving circuitry, wherein the first reference electrode is coupled to a first side of an opening in the sensor and a second reference electrode is coupled to a second side of the opening such that an object passes through the opening and between the first reference electrode and the second reference electrode, the method further comprising:

holding the first reference electrode at a first voltage potential;

electrically connecting the second reference electrode to a resistor that is electrically connected to a second voltage potential; and electrically connecting the second reference electrode to an electronic driving circuit that generates the periodic signal in response to the object altering the capacitance between the first and second reference electrodes.

4. The method according to claim 3, wherein the electronic driving circuit is a monostable multivibrator circuit having a clock signal input.

5. The method according to claim 4, wherein a 2 MHz clock signal is provided to the clock signal input.

6. The method according to claim 1, wherein the method further comprises:

sampling the sensed signal using an A-to-D Converter module to generate sampled data and storing the sampled data within a memory array; and applying cascaded difference filters to the sampled data stored within the memory array.

7. The method according to claim 6, wherein the first time the cascaded difference filter is applied, the cascaded difference filter uses two adjacent data samples at a time from the memory array to check for the occurrence of the external event; and if no signal change is found, an index used by the cascaded difference filters is incremented so that the cascaded difference filters are again applied using data samples spaced at sequentially larger time intervals from the memory array until the occurrence of the external event is found or all difference filters have been executed.

8. The method according to claim 7, wherein a difference value is generated by the cascaded difference filters by subtracting the value of previously sampled data from later sampled data and wherein the difference values are compared to the threshold value to find the occurrence of the external event.

9. The method according to claim 7, wherein each data sample represents a digitally low-pass filtered value sampled from the sensed signal.

10. An apparatus for detecting a change in an output signal having a level that fluctuates in response to an external event, the apparatus comprising:

an adjustable amplifier module for generating an amplified signal and having a signal input and an offset input, the signal input being electrically connected to the output signal;

an offset adjusting module for continually adjusting the offset voltage of the adjustable amplifier module by generating an offset signal based upon the amplified signal to maintain an observed median value of the observed range for the amplified signals between a minimum and a maximum observed value, the offset signal being coupled to the offset input of the adjustable amplifier module;

cascaded difference filters module for receiving the amplified signal to detect an occurrence of the external event by detecting when the amplified signal changes to a value greater than a threshold value; and a threshold adjusting module for continually adjusting the threshold value based upon the amplified signal to maintain the threshold value at a desired percentage of a maximum range of observed amplified signal values.

11. The apparatus according to claim 10, further comprising:
sensing circuitry responsive to the external event, the sensing circuitry generating a periodic signal having a characteristic that varies when the external event occurs; and
a low-pass filter for filtering the periodic signal to produce the output signal.

12. The apparatus of claim 11, wherein the sensing circuitry is part of a label sensor, the sensing circuitry comprising:
a first reference electrode held at a first potential;
a second reference electrode connected to a resistor that is electrically connected to a second potential; and
electronic driving circuitry electrically connected to the second reference electrode;
wherein the first reference electrode is coupled to a first side of an opening in the sensor and the second reference electrode is coupled to a second side of the opening such that an object passes through the opening and between the first reference electrode and the second reference electrode and alters the capacitance between the first and second reference electrodes; and
wherein the electronic driving circuitry generates the periodic signal in response to the altered capacitance.

13. The apparatus according to claim 12, wherein the electronic driving circuit is a monostable multivibrator circuit having a clock signal input.

14. The apparatus according to claim 13, wherein a 2 MHz clock signal is provided to the clock signal input.

15. The apparatus according to claim 10, wherein the apparatus further comprises:
an A-to-D Converter module electrically connected to the amplified signal for sampling the amplified signal to generate sampled data; and
a memory array for storing the sampled data generated by the A-to-D Converter module; and
wherein the cascaded difference filters module processes the sampled data stored within the memory array.

16. The apparatus according to claim 15, wherein
the first time the cascaded difference filters module is applied, the cascaded difference filters module uses two adjacent data samples at a time from the memory array to check for the occurrence of the external event;
if no signal change is found, an index used by the cascaded difference filters module is incremented so that the filter uses data samples spaced at sequentially larger time intervals from the memory array to check for the occurrence of the external event.

17. The apparatus according to claim 16, wherein a difference value is generated by the cascaded difference filters module by subtracting the value of previously sampled data from later sampled data; and wherein the difference value is compared to the threshold value to find the occurrence of the external event.

18. The apparatus according to claim 16, wherein each data sample represents a digitally low pass filtered value sampled from the amplified signal.

19. A system for providing a capacitive label sensor having a ground plate coupled to a first side of an opening in the sensor and a sensor signal plate coupled to a second side of the opening such that an object passes between the ground plate and the sensor signal plate, the system comprising:

means for electrically connecting the ground plate to a system ground;
means for electrically connecting the sensor signal plate to a first end of a first resistor at a first connection and to an electronic driving circuit receiving an input signal emanating from the sensor signal plate and generating a periodic signal, wherein the first resistor is electrically coupled between the first connection and a supply voltage;
means for filtering the periodic signal using a low-pass filter to generate a filtered periodic signal;
means for amplifying the filtered periodic signal to generate a sensed capacitance signal;
means for continually adjusting an offset voltage which is applied to the amplified and filtered periodic signal to maintain a mean value of the sensed capacitance signal at a desired voltage;
means for sampling the sensed capacitance signal using an A-to-D Converter module to generate sampled data and storing the sampled data within a memory array;
means for applying cascaded difference filters to the sampled data stored within the memory array;
means for determining an observed edge of a label passing through the opening in the label sensor by determining when the sensed capacitance signal changes to a value greater than a threshold value; and
means for continually adjusting the threshold value to maintain the threshold value at a desired percentage of the maximum range of sensed capacitance signals;
wherein the input signal is a periodically rising signal having an RC time constant based upon the first resistor and the sensor capacitance within the opening of the sensor.

20. A computer program product for detecting a change in an output signal having a level that fluctuates in response to an external event, wherein the computer program product configured to implement acts comprising:
amplifying the output signal using an amplifier to generate a sensed signal;
continually adjusting an offset voltage applied to the amplified output signal to maintain a mean value of the sensed signal at a desired voltage; and
detecting an occurrence of the external event by detecting when the sensed signal changes to a value greater than a threshold value.

21. A computer program product for detecting a change in an output signal having a level that fluctuates in response to an external event, the computer program product configured to implement acts comprising:
amplifying the output signal using an amplifier to generate a sensed signal;
detecting an occurrence of the external event by detecting when the sensed signal changes to a value greater than a threshold value; and
continually adjusting the threshold value used to detect the occurrence of the external event to maintain the threshold value at a desired percentage of a maximum range of sensed signal values.

22. A computer program product for detecting a change in an output signal having a level that fluctuates in response to an external event, the computer program product configured to implement acts comprising:
amplifying the output signal using an amplifier to generate a sensed signal;

detecting an occurrence of the external event by detecting when the sensed signal changes to a value greater than a threshold value; and wherein the external event is detected by application of cascaded difference filters for quantifying the change in signal over multiple time intervals.

23. A computer program product for detecting a change in an output signal having a level that fluctuates in response to an external event, the computer program product configured to implement acts comprising:

amplifying the output signal using an amplifier to generate a sensed signal;

continually adjusting an offset voltage which is applied to the amplified output signal to maintain a mean value of the sensed signal at a desired voltage;

detecting an occurrence of the external event by detecting when the sensed signal changes to a value greater than a threshold value;

continually adjusting the threshold value used to detect the occurrence of the external event to maintain the threshold value at a desired percentage of a maximum range of sensed signal values; and wherein the external event is detected by application of cascaded difference filters for quantifying the change in signal over multiple time intervals.

24. An apparatus for detecting a change in an output signal having a level that fluctuates in response to an external event, the apparatus comprising:

an adjustable amplifier module for generating an amplified signal and having a signal input and an offset input, the signal input being electrically connected to the output signal; and an offset adjusting module for continually adjusting the offset voltage of the adjustable amplifier module by generating an offset signal based upon the amplified signal to maintain an observed median value of the observed range for the amplified signals between a minimum and a maximum observed value, the offset signal being coupled to the offset input of the adjustable amplifier module; and a processor for receiving the amplified signal to detect an occurrence of the external event by detecting when the amplified signal changes to a value greater than a threshold value.

25. An apparatus for detecting a change in an output signal having a level that fluctuates in response to an external event, the apparatus comprising:

an adjustable amplifier module for generating an amplified signal and having a signal input, the signal input being electrically connected to the output signal; and a cascaded difference filters module for receiving the amplified signal to detect an occurrence of the external event by detecting when the amplified signal changes to a value greater than a threshold value.

26. An apparatus for detecting a change in an output signal having a level that fluctuates in response to an external event, the apparatus comprising:

an adjustable amplifier module for generating an amplified signal and having a signal input, the signal input being electrically connected to the output signal;

a threshold adjusting module for continually adjusting the threshold value based upon the amplified signal to maintain the threshold value at a desired percentage of a maximum range of observed amplified signals; and a processor for receiving the amplified signal to detect an occurrence of the external event by detecting when the amplified signal changes to a value greater than a threshold value.

* * * * *